Patented Sept. 23, 1930

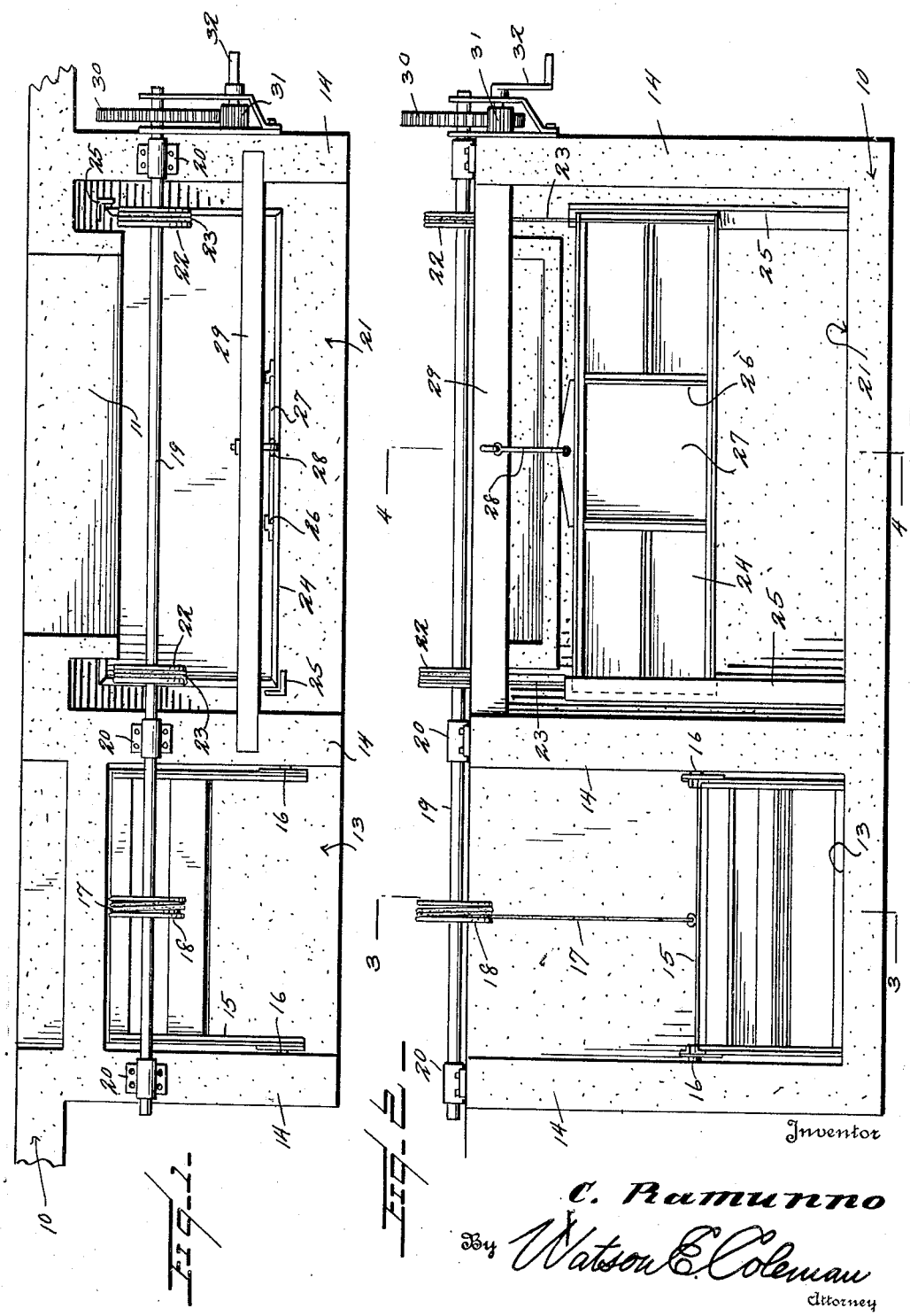

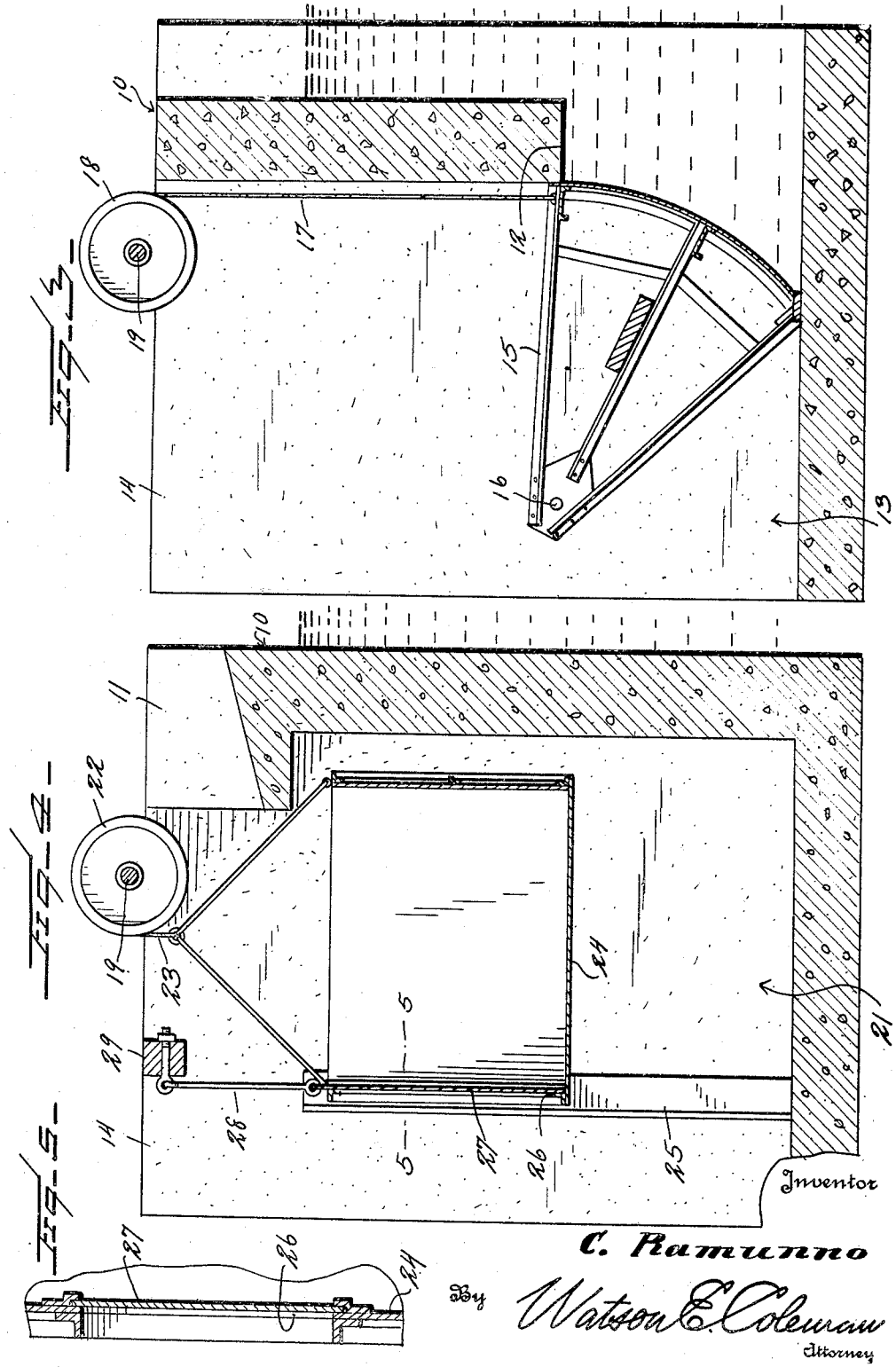

1,776,371

UNITED STATES PATENT OFFICE

CHARLIE RAMUNNO, OF EL MORO, COLORADO

AUTOMATIC FLOOD GATE

Application filed November 8, 1928. Serial No. 318,029.

This invention relates to gates for automatically controlling the discharge of water from behind a dam, wall or other abutment and particularly to that class of gates wherein a flood gate is automatically opened when the water rises beyond a predetermined point.

The general object of this invention is to provide a very simple, easily operated, automatic gate controlling mechanism of this character and more specifically to provide a gate controlling the discharge of water from behind the dam, which gate is lifted by the descent of a water tank or bucket which is normally raised and empty but which is filled and caused to descend when water passes over the spillway of the dam.

A further object is to provide means whereby the tank will be opened for the discharge of water when it has descended and whereby the tank will remain in its lowered position and hold the gate open until the water has sunk below the level of the spillway.

My invention is illustrated in the accompanying drawings, wherein:—

Figure 1 is a top plan view of the dam or like structure having my automatic gate applied thereto;

Figure 2 is a rear elevation of the structure shown in Figure 1;

Figure 3 is an enlarged cross section on the line 3—3 of Figure 2;

Figure 4 is a section on the line 4—4 of Figure 2;

Figure 5 is a fragmentary cross section through the gate showing the guides therefor.

Referring to these drawings, 10 designates a dam or water wall of any suitable character having the spillway 11. The dam 10 beyond the spillway is formed with the outlet 12 which is adjacent the bottom of the structure 13 wherein the flood gate is disposed. Mounted between the walls 14 of the structure 13 is a standard radial gate 15 of the breast wall type which is pivoted as at 16 and adapted to be raised by means of a cable 17 extending over a winding drum 18 mounted upon a shaft 19. The shaft 19 is mounted in three bearings 20 carried upon the walls 14. This shaft extends parallel to the spillway 11 and over a discharge pit 21. Mounted over this discharge pit 21 and upon the shaft 19 are the two pulleys or winding drums 22 over which cables 23 extend, these cables being connected to a water tank 24. This water tank moves vertically in guides 25 if necessary, these guides being angular. There may be guides at all four corners of the tank if desired though ordinarily guides at two corners of the tank are sufficient. This tank may have any desired length and is provided upon one face with a discharge opening 26 controlled by a vertically movable gate 27 operating in slides.

This gate is connected by a link 28 to a beam 29 extending between the walls 14 so that when the tank 24 lowers the gate 27 will be held from downward movement and will thus open and when the tank 24 rises the gate will close.

The operation of this mechanism is as follows:—

Under normal circumstances the gate 15 is closed and the tank 24 is raised but if the water should rise above the floor of the spillway 11, the water will commence to rush over the spillway and into the tank 24. When the tank is filled it will overweight the gate 15 and the tank will descend lifting the gate. As the tank descends the gate 27 of the tank will be raised so as to discharge the water when the tank is lowered and the tank will remain in this lowered position by the weight of water passing over the spillway and descending into the tank and then out along the wasteway. When the water has lowered below the floor of the spillway there will be no water in the tank 24 and, of course, the tank will then rise and the gate 15 will close, the gate 15 counterbalancing the empty tank 24.

For the purpose of operating the gate by hand, I mount upon the shaft 19, the gear wheel 30 and provide a pinion 31 having a crank shaft and crank 32. By this means, the gate may be raised or lowered by hand as before remarked.

I claim:—

1. An automatic flood gate comprising a wall having a gateway adjacent the lower end of the wall and a spillway adjacent the top of the wall but offset with relation to the gateway, a vertically movable gate controlling passage through the gateway, a tank open at its upper end and disposed on the outer face of the wall coincident with the spillway and receiving water passing over the floor of the spillway, a shaft having flexible connections wound thereon and operatively connected to the gate, flexible connections wound upon the shaft and operatively connected to the tank, the tank being raised as the gate is lowered and the gate raised as the tank is lowered whereby as the tank fills with water from the spillway and descends, the gate shall be opened, and a gate for the tank held from relative downward movement with the tank and gradually opening as the tank descends to discharge the contents of the tank in proportion to the descent thereof, the water passing over the spill-way as the gate is lowered holding the tank in a lowered position.

2. An automatic flood gate comprising a wall having a gateway adjacent the lower end of the wall and a spillway adjacent the top of the wall but offset with relation to the gateway, a tank open at its upper end and disposed on the outer face of the wall coincident with the spillway and receiving water passing over the floor of the spillway, said tank when filled to a predetermined point counterbalancing the gate, a shaft having flexible connections wound thereon and operatively connected to the gate, flexible connections wound upon the shaft and operatively connected to the tank, the tank being raised as the gate is lowered and the gate raised as the tank is lowered whereby as the tank fills with water from the spillway and descends, the gate shall be opened, and means for discharging the tank as the tank descends, said means comprising a gate constituting one side wall of the tank and fitting fully within the tank when the tank is raised, and means holding the gate from downward movement with the tank whereby as the tank descends the gate will gradually open in proportion to the descent of the tank, the water passing over the spill-way being discharged on to the tank when lowered and holding it in lowered position.

3. An automatic flood gate comprising a wall having a gateway adjacent the lower end of the wall and a spillway adjacent the top of the wall, the spillway and gateway being laterally offset with relation to each other, a gate controlling the passage through the gateway, a pivotal axis for the gate extending parallel to the said wall but spaced therefrom, a shaft extending parallel to the wall and above the gate and carrying winding drums, connections passing over said winding drums and engaging the gate, a winding drum mounted upon the shaft above the spillway, a tank open at its upper end and at one side, a flexible connection passing over said tank to the drum, the descent of the tank causing rotation of the shaft to lift the gate and the descent of the gate causing the rotation of the shaft to lift the tank, and a gate forming one wall of the tank when the tank is raised, said gate being supported from downward movement with the tank whereby as the tank is lowered the discharge gate thereof will be opened in proportion to the descent of the tank, the water from the spill-way being discharged on to the tank and holding it in its lowered position so long as water passes from the spill-way.

In testimony whereof I hereunto affix my signature.

CHARLIE RAMUNNO.